Dec. 4, 1934.　　　E. A. SPERRY, JR　　　1,982,702
GYRO PILOT FOR AIRCRAFT
Filed Nov. 29, 1929　　2 Sheets-Sheet 1.
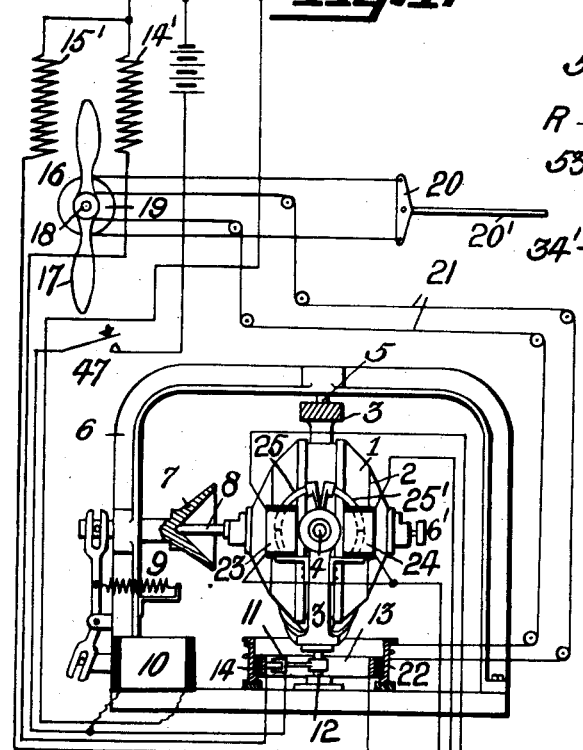
Fig.1.
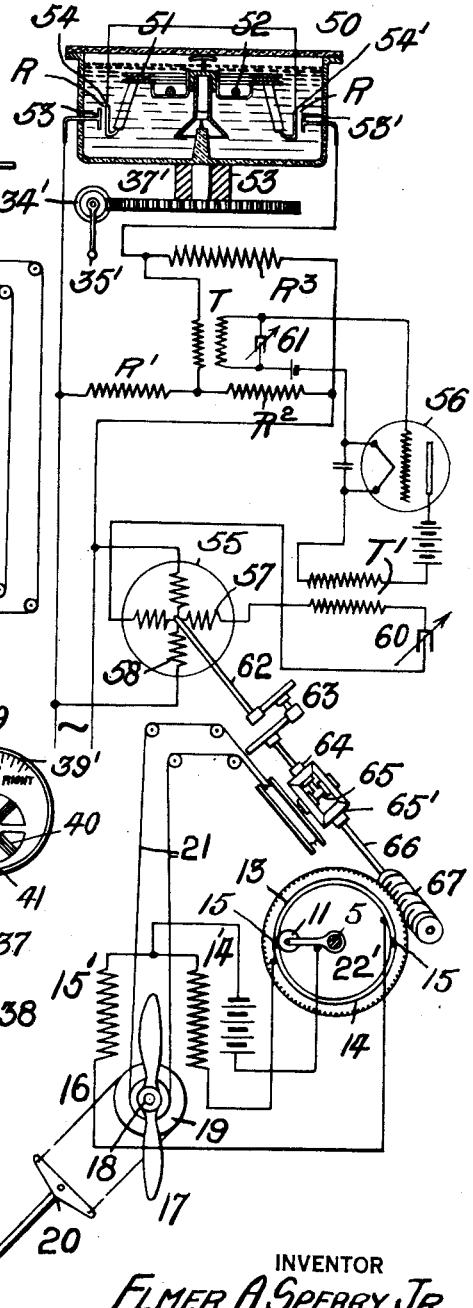
Fig.2.
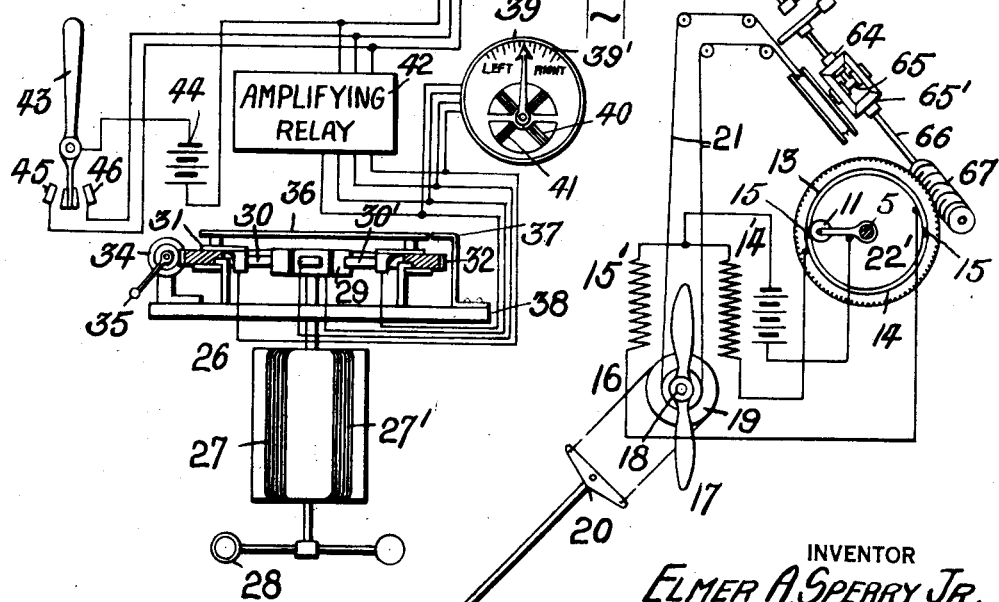
INVENTOR
ELMER A. SPERRY, JR.
BY Herbert H. Thompson
his ATTORNEY

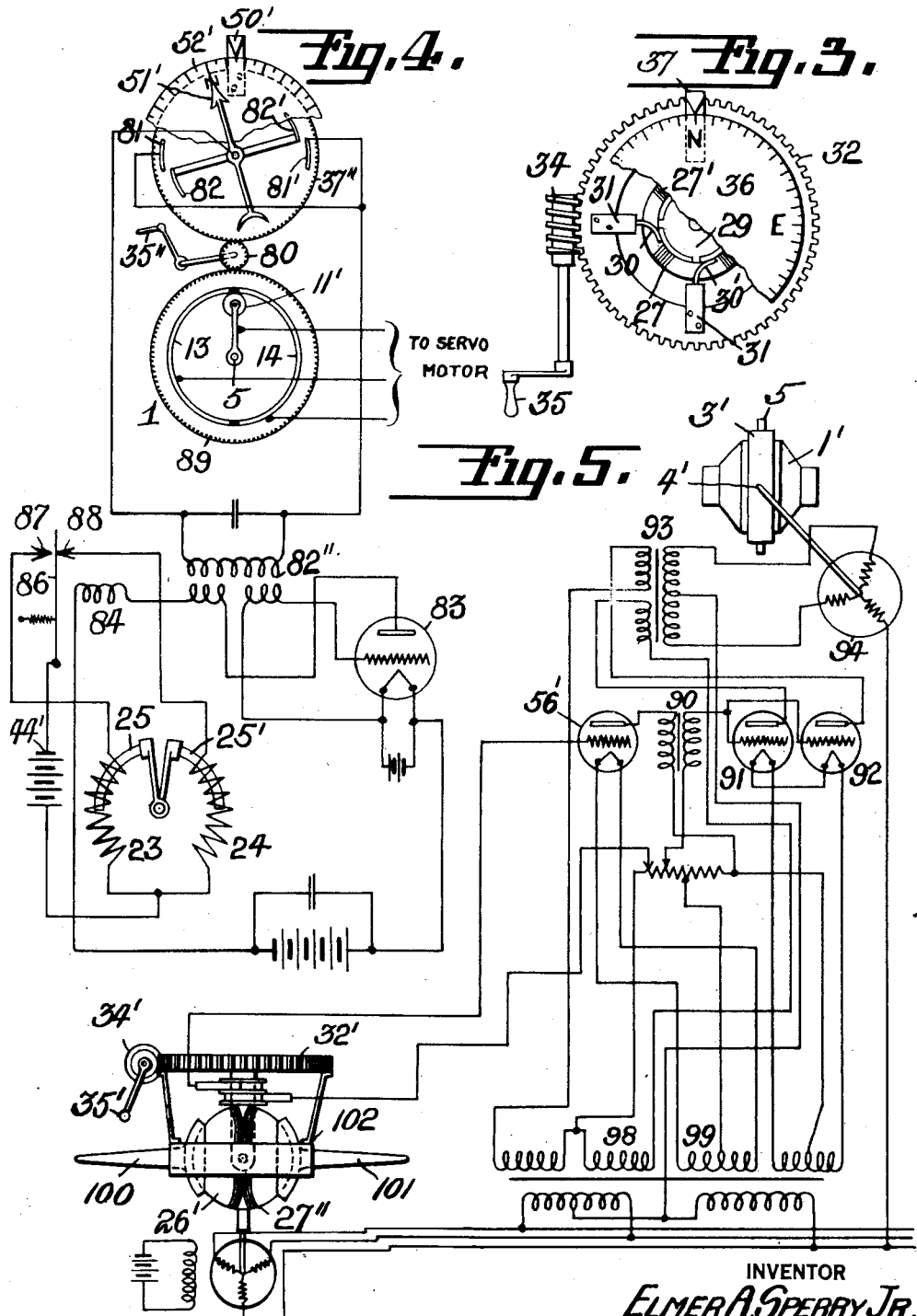

Patented Dec. 4, 1934

1,982,702

UNITED STATES PATENT OFFICE 1,982,702

GYRO PILOT FOR AIRCRAFT

Elmer A. Sperry, Jr., Brooklyn, N. Y., assignor to Sperry Gyroscope Company, Inc., Brooklyn, N. Y., a corporation of New York Application November 29, 1929, Serial No. 410,526

21 Claims. (Cl. 172—282)

This invention relates to direction maintaining means for dirigible craft, such as airplanes, ships and the like. My invention has a special application to a direction maintaining means to serve as a baseline for automatic steering of aircraft. I am aware that it has been proposed to steer aircraft both from a free gyroscope and from the form of magnetic compass generally known as the earth inductor compass, but either form of baseline has proven entirely satisfactory. According to my invention, I propose to combine a free gyroscope with a magnetic compass (either earth inductor or ordinary type) in a novel manner whereby a persistent and reliable baseline may be secured which is substantially unaffected by acceleration pressures and at the same time is not subject to wandering, but has a positive directive force.

Referring to the drawings in which several forms of the invention are shown:

Fig. 1 is a diagram showing how I propose to combine an earth inductor magnetic compass and a free gyro as a direction maintaining means for automatic steering purposes.

Fig. 2 is a similar wiring diagram showing a modified system in which an ordinary magnetic compass is employed and in which the magnetic compass corrects the gyroscope in a different manner than that shown in Fig. 1.

Fig. 3 is a top plan view of the earth inductor unit shown in Fig. 1.

Fig. 4 is a wiring diagram showing still another method of using the magnetic compass to influence the gyroscope.

Fig. 5 shows a modified system of controlling the gyroscope from a simpler form of earth inductor compass than in Fig. 1.

As the basic direction maintaining unit, I propose to employ a gyroscope 1, having three degrees of freedom, or in other words, a free, substantially non-pendulous gyroscope. The rotor may be driven by any suitable means, either electrically or by air jets. Said gyroscope is mounted for rotation within the casing 2 on a horizontal spinning axis and the casing in turn is mounted for oscillation in a vertical ring 3 on horizontal axis 4 at right angles to the spinning axis. The ring 3 in turn is mounted for turning about the vertical axis 5 in the main frame 6. An adjustable latitude weight 6' may be mounted on the case, if desired. A centralizing lock or cage 7 is provided for the gyroscope both to lock it when not in use and to cage or centralize it when it is desired to change course. The cage is shown as normally held in engagement with the pin 8 projecting from the gyroscope, by means of a spring 9, but when the solenoid 10 is excited the cage is withdrawn and the gyro freed with its spinning axis preferably fore and aft on the plane.

The actual steering of the plane is effected by the relative turning of the plane and gyroscope. For this purpose a sliding contact or trolley 11 may be secured to the stem 12 projecting from the vertical ring, said trolley contacting with spaced annular contacts 13 and 14 (see also Fig. 4). The trolley normally rests on one of dead spaces 15 between the contacts, but when the plane turns the contact will be moved on to a live section thus exciting one or the other of the windings 14' and 15' on the servo motor 16. Said servo motor is represented as of the wind-driven type comprising a windwheel 17 which drives the servo motor continuously. When one or the other of the windings 14' or 15' is excited, the shaft 18 of the wind motor is clutched to the drum 19 connected to the rudder bar 20 so as to turn the rudder 20' in the proper direction to bring the craft back on its course. Such servo motors and caged gyro systems are well known in the art (see patents of Lawrence B. Sperry Nos. 1,707,690 and 1,757,096 dated April 2, 1929 and May 6, 1930, respectively) and need not be further described herein.

A follow-up connection 21 is shown from the drum 19 back to the annular member 22 which carries the contact segments 13 and 14 so that when the rudder is moved, member 22 is turned to bring the dead section of the contacts around to the trolley and stop overrunning of the rudder.

Such a system will maintain the craft on a predetermined course for some little time, but the free gyroscope in time tends to wander from its original position. To overcome this difficulty, I propose to provide an additional element having positive directive force, such as a magnetic compass, either of the usual type or of the earth inductor type, which compass is employed to apply a correction to the gyroscopic system, such that the original course is maintained. To effect this purpose I preferably apply a corrective torque about the horizontal axis of the gyroscope, which causes precession of the gyroscope about its vertical axis back to its original position.

As shown in Fig. 1, there is provided on the gyroscope a pair of torque applying solenoids 23, 24 fixed to the vertical ring 3. Cooperating therewith there is fixed to the gyro casing or to the horizontal trunnion 4 thereof a pair of oppositely disposed soft iron plungers or cores 25—25' which partially enter the solenoid windings so that when a greater E. M. F. is impressed on one solenoid than on the other, a torque will be applied about the horizontal axis of the gyroscope in one direction or the other.

Said windings may be directly controlled from the amplified output of an earth inductor compass 26, which is shown as comprising a plurality of angularly disposed windings 27—27' revoluble on a vertical axis in the earth's magnetic field, a wind motor 28 being shown to revolve the same. Current is taken from the commutator 29 thereof by two pairs of brushes 30 and 30' which are rotatably mounted about the spinning axis of the coils 27—27'. Said brushes may be mounted in brush holders 31 secured to an annular worm gear 32 which may be adjusted by rotating the worm 34 by crank 35. A compass card 36 may be mounted on the brush holders, if desired, which is read in connection with an index 37 on a fixed base 38. It will be understood that the relative amount of current collected by the two sets of brushes depends on the position of the brushes in azimuth and that the turning of crank 35 or the turning of the plane will vary the balance between the two pairs. The output of the earth inductor compass or generator may be led to the indicator 39 having index 39' which operates in the usual manner to show when the craft deviates to the right or left of the prescribed course. Opposed coils 40 and 41 connected to the respective brushes acting on the armature of index 39' may be employed for this purpose. As is usual in earth inductor compasses, the elements of the same, such as the brush holders, are initially adjusted so that when the craft is on the prescribed course the indicator 39 reads zero, and this is usually done by adjusting the brushes in azimuth until the current in the two coils 40 and 41 of the indicator 39 is balanced. In case of deviation from the course, however, the current will increase in one coil 40 above that in 41, for instance, causing a deflection of the indicating pointer.

Preferably I make use of this variation in current flow to operate the solenoids and for this purpose I amplify these currents through some suitable form of thermionic amplifying relay, indicated generally at 42, and connect the output side thereof to the above mentioned solenoid coils 23 and 24. Preferably some form of power amplifier is used, such as described hereinafter, in connection with Figs. 2, 4 or 5, but no great amplification is needed for the applied torque is kept very small so that the gyroscope will be substantially unaffected by temporary disturbance of the earth inductor compass.

In order to enable the aviator to adjust the position of the gyro quickly, if desired, I may provide an auxiliary, manually operated switch 43 which may be used to throw a source of electricity 44 directly on one or the other of said solenoids through contacts 45—46, thereby exerting a much greater torque on the gyro than is exerted from the earth inductor control. Such a means may be used to control the position of the gyro manually without caging the same as above described.

The operation of this form of my invention is briefly as follows: While in the air, the course is maintained by the servo motor which is controlled from the contacts on the gyroscope. In case, however, the gyroscope should stray, the ship will deviate from its course which will cause the earth inductor compass to excite the proper solenoid to bring the gyroscope, and hence the ship, back to the predetermined heading. Temporary deviations of the earth inductor compass, however, which occur frequently in airplanes from various causes will not disturb the gyroscope on account of its slow response to the earth inductor compass, the currents through the solenoids being kept very weak for this purpose. If it is desired to change the course, this may be effected by several different methods. Preferably the aviator first, by opening contact 47, cages the gyroscope. The aviator then brings the ship around to its desired course either by manual operation of the rudder or through the servo motor, as explained in the aforesaid Patent No. 1,757,096. When the ship arrives on its prescribed course, the aviator turns the handle 35 of the earth inductor compass until the indicator 39 reads zero, and releases the gyroscope by closing switch 47, whereupon the plane is ready to maintain the set course. If only a gradual change of course is desired, the aviator may effect the same merely by turning the crank 35, which by changing the output of the earth inductor compass will cause the gyroscope to gradually shift its position taking the plane with it. A change of course may also be effected simply by manipulating the handle 43 which also works through the gyroscope in a quicker manner than the earth inductor compass. Such a device is adapted for use as a pilot director on a bombing plane having a bombsight.

In Fig. 2 I have shown several modifications. In this figure is illustrated one method by which an ordinary magnetic compass may be used to assist in governing the course, instead of the earth inductor form. The figure also illustrates a different method of correcting the gyroscope in which no torque is applied on the gyroscope, but the correction is made through the control contacts on the gyroscope. A magnetic compass is shown at 50 having the usual card 51 and magnetic element or elements 52. The entire compass may be rotatably mounted on a base 53, the compass being adjusted in azimuth as by means of a worm 34' and handle 35', the former meshing with the worm wheel 37'.

The relative position of the case 50 and magnetic compass is utilized to control the gyro elements. For this purpose I may fill the casing 50 with a liquid which will conduct electricity to a limited extent, such as slightly acidulated water and provide adjacent plates 53 and 54 fixed to the casing and rotatable element respectively. Said plates are spaced a short distance and normally lie opposite each other so that the resistance between the same is a minimum. Said plates may be duplicated on the opposite side of the compass, as at 53'—54'. The varying resistance between said plates, as relative turning takes place between the magnetic element and case, is utilized to govern the reversible motor 55. This may be accomplished by connecting the variable resistances R, R in series and connecting them to other resistances $R_1$, $R_2$ and $R_3$ to form a Wheatstone bridge arrangement, which is connected to a source of alternating current. The equalizing conductor or balancing connection of the bridge forms the input circuit of the amplifier unit which includes one or more vacuum tubes 56 and the usual transformers T and $T_1$ and condensers. In the output circuit on the amplifier unit is inserted one winding 57 of the two windings of the two-phase motor 55. The other or main winding 58 of said motor is connected to the said source of alternating current.

If the variable resistance (RR) is set in such a manner that the bridge is in equilibrium, no current will flow in the auxiliary winding 57 of the motor for there is no alternating current flowing in the input circuit of the amplifying unit. The motor will, therefore, not operate. When the resistance is varied, an alternating current potential will be impressed on the circuit of the amplifier, said potential being in phase or out of phase with the voltage of the bridge according to the direction of variation. This current amplified will then produce a rotating field. In order to make the field 57 as strong as possible, a variable condenser 60 may be inserted in the circuit including the winding 57 so as to tune the circuit to resonance. For tuning the system to the most favorable value of phase difference between the auxiliary field and the main field, a second variable condenser 61 may be used in the input circuit of the amplifier. It will thus be apparent that the slightest movement of the magnetic element with respect to the casing by changing the resistance of the circuit will start the motor in one direction or the other.

Instead of applying a torque on the gyroscope, as in Fig. 1, I employ the motor in this instance to apply the correction to the gyro by effecting a slight adjustment in the relative position of the contacts 13, 14 at the base of the gyro with reference to the contact 11 on the gyroscope. This is shown as accomplished by connecting the shaft 62 of the motor through a multiple reduction gearing 63 to one side 64 of a differential gear train. The follow-up connection 21 from the servo motor 19 is brought in through the second arm 65 of said differential gear train, while the third arm 65' drives the shaft 66 of the worm 67 which rotates the base 22' carrying the contact rings 13, 14. The reduction gearing is provided so that the major control of the plane remains in the gyroscope, the control from the magnetic compass being retarded or made sufficiently slow so that temporary deviations of the magnetic needle, from any cause, do not materially disturb the set course, and it is only when the gyroscope strays that the correction of the course is applied from the magnetic compass.

Still another modification is illustrated in Fig. 4. In this form also a standard magnetic compass is employed, but in this case it is utilized to apply a torque on the gyroscope somewhat as in Fig. 1. The magnetic element of a magnetic compass and the card thereon is shown at 51', 52', the card being readable in connection with the shiftable lubbers line 50', which is adjustable as in Fig. 2 by the rotation of a crank 35''. Said crank is shown as turning a pinion 80 which meshes with an annular gear 37'' which carries the lubbers line 50'. Said ring also carries one or more plates 81—81' of a condenser, the cooperating plates 82—82' being mounted on the magnetic element. Said condenser is placed in an oscillatory circuit which serves to excite the solenoids 23—24 on the gyroscope as in Fig. 1. As shown the condenser plates are in a tuned circuit including the transformer 82'' and one or more vacuum tubes 83. The output of said tube is connected to the relay coil 84 which pulls the biased relay armature 86 to the right against contacts 88 when the circuit is tuned by movement of plates 81, 81' the spring normally closing contact 87. Said contacts are placed in a power circuit which includes a weak source of power 44' and high resistance solenoids 23—24. Pinion 80 is also shown as operating the annular gear 89 which carries the reversing segments 13—14 at the base of the gyroscope and which cooperate with a trolley 11' on the gyroscope.

According to this form of the invention, all that it is necessary to do when it is desired to change the course is to operate the crank 35'' which not only changes the relative position of the magnetic compass and its lubber ring but also the relative position of the contacts and the gyroscope. Therefore, caging of the gyroscope to change course quickly is not necessary when provision is made for directly shifting the contacts with respect to the gyroscope. In this figure the servo motor rudder and follow-up systems are omitted for the sake of clearness, but it is understood that they are intended to be employed in a manner similar to that shown in Figs. 1 and 2.

In Fig. 5 I have illustrated a wiring diagram of a method of employing the variations in E. M. F. of the earth inductor compass having a single winding 27'' to apply opposite torques on the gyroscope. In this form the A. C. output of the earth inductor compass (which is zero when the plane is on the course) is connected between the grid and filament of the vacuum tube 56' and the output of said tube is led through a push-pull amplifier which may comprise a transformer 90 and a pair of grid-controlled gas-filled rectifier tubes 91 and 92, the output of which is connected through Scott connected transformer 93 to torque motor 94. Said motor in this instance is a polyphase (three phase) motor 94, two of the phases being connected to the transformer 93 and a third phase to one phase of the three phase A. C. supply. The other two phases of said supply are connected through suitable transformers 98—99 into the amplifying circuit replacing the usual A, B and C batteries by taps from the transformers. In such a system the phases are arranged so that the building up of E. M. F. or a shift of phase of the earth inductor compass in one direction causes the motor 94 to apply torque to the gyro in one direction while a building up of E. M. F. or a shift of phase in the other direction of the earth inductor compass reverses two of the phases in the three phase motor and hence applies a torque on the gyro in the opposite direction. Such an amplifying circuit is described more in detail in the copending application of Wittkuhns and Watkins, Serial No. 381,660 filed July 27, 1929, no claim being made herein to the specific circuit. To maintain the proper phase relationship it is, of course, necessary to drive the earth inductor compass in the proper phase relationship with the three phase supply for the amplification and torque applying system and to this end I have shown the armature 26' as rotated by a polyphase synchronous motor 28' driven from the said supply.

Instead of shifting the brushes to change the output of the earth inductor compass as in Fig. 1, it is possible to shift, in effect, the field of the compass. While the earth's field is, of course, fixed in azimuth, the resultant lines of force traversing the armature may be shifted by providing unwound pole pieces 100—101 of high permeability, such as the new alloy, permalloy, and shifting the position of these pole pieces for changing course instead of shifting the brushes themselves. This idea is also shown diagrammatically in Fig. 5 in which the pole pieces are shown as mounted on a gimbal frame work 102 suspended from rotatable gear 32' which may be turned by handle 35' as in Fig. 1.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use. It will be understood that in the appended claims I use the phrase "magnetic compass" in its broadest sense, i. e., any indicating means operated by the earth's magnetic field, including by the term both the earth inductor and ordinary magnetic compass except where otherwise indicated.

Having described my invention, what I claim and desire to secure by Letters Patent is:

1. In an automatic steering means for craft, a normally free gyroscope, means actuated therefrom for steering the craft, a magnetic compass, means for setting the course thereon, and automatic means operable by said magnetic compass upon deviation of the craft from the course set with respect thereto, for correcting the gyroscope.

2. A baseline for operating automatic steering for craft comprising a magnetic compass, a free gyroscope, means operated from the latter for effecting automatic steering, and means controlled by the magnetic compass for correcting the gyroscope.

3. A direction maintaining means for aircraft and the like comprising a free gyroscope, electro-magnetic means for exerting a corrective torque thereon, and an earth inductor compass having the output thereof controlling said torque applying means.

4. A baseline for operating automatic steering for craft comprising a magnetic compass, a free gyroscope, means operated from the latter for effecting automatic steering, means for slowly correcting the course steered by said gyroscope, and means responsive to relative turning of the craft and magnetic compass for operating said correcting means.

5. A direction maintaining means for aircraft and the like comprising a free gyroscope, electro-magnetic means for exerting a corrective torque thereon, and means responsive to continued deviation of the craft from its course for exciting said means to correct the gyroscope.

6. A baseline for operating automatic steering for craft comprising a magnetic compass, a free directional gyroscope, and means jointly operated by said compass and gyroscope for governing the course in azimuth.

7. A direction maintaining means for aircraft comprising a meridian indicator, a free indicator, means operated from one of said indicators for governing the course, and means controlled by the other of said indicators for preventing deviation of said first indicator.

8. A direction maintaining means for aircraft and the like comprising a free gyroscope, means for exerting a torque about the horizontal axis thereof, means for setting the craft on a desired course, and means responsive to deviation of the craft from said course for bringing said first named means into action.

9. A baseline for operating automatic steering for craft comprising a magnetic compass, a free directional gyroscope, and means jointly operated by said compass and gyroscope for governing the course, said means including a controller directly responsive to relative turning of the craft and gyroscope but slowly responsive to relative turning of the craft and compass.

10. In an automatic steering device for aircraft, a magnetic compass and a gyroscope, joint means controlled thereby for maintaining a course, and means for changing the course including means for locking the gyroscope while the course is being changed and means for resetting the course at the magnetic compass.

11. In an automatic steering device for aircraft, a magnetic compass and a gyroscope, joint means controlled thereby for maintaining a course, means for changing the relation between said compass and the craft, and means brought into action upon such change for slowly precessing the gyroscope to change the course.

12. In an automatic steering device for aircraft, a magnetic compass and a gyroscope, joint means controlled thereby for maintaining a course, means for changing the relation between said compass and the craft, means for changing the relation between the gyroscope and the craft to change the course, and a common means for operating both said last-named means.

13. A direction maintaining means for aircraft comprising a gyroscope, opposed electro-magnetic means for exerting torques thereon about its horizontal axis in either of two directions, an earth inductor device for governing said torques, said device having a pair of coils at an angle to each other, and means for amplifying the output of said coils to operate said opposed electro-magnetic means.

14. A direction maintaining means for aircraft and the like comprising a free gyroscope, means for exerting a corrective torque thereon, a magnetic compass controlling said torque applying means upon deviation of the craft from its course and means operable at will for exerting an overpowering torque on said gyroscope for temporarily changing the course.

15. A baseline for operating automatic steering for craft comprising a magnetic compass, a free directional gyroscope, and means jointly operated by said compass and gyroscope for governing the course, said means including a controller primarily responsive to relative turning of the craft and gyroscope but secondarily responsive to relative turning of the craft and compass.

16. In an automatic steering device for aircraft, a magnetic compass, a gyroscope, means controlled by the relative position of the gyroscope and craft for steering the craft, means controlled from the magnetic compass for slowly precessing the gyroscope, and means for changing the course including a means for altering the relation between the magnetic compass and craft.

17. In an automatic steering means for aircraft, a free or directional gyroscope, a controller governed by the relative position of the craft and gyroscope, a magnetic compass, a second controller governed by the relative position of the craft and compass, means for turning said second controller to change course, and means actuated by said second controller for adjusting said first controller.

18. In an automatic steering means for aircraft, a free or directional gyroscope, a controller governed by the relative position of the craft and gyroscope, a magnetic compass, a second controller governed by the relative position of the craft and compass, and slow acting means actuated by said second controller for altering the relative position of the first controller and gyroscope.

19. In an automatic steering means for aircraft having a rudder, a free or directional gyroscope, a controller governed by the relative position of the craft and gyroscope for turning said rudder, a follow-back connection from said rudder to said controller, a magnetic compass, a second controller governed by the relative position of the craft and compass, means for turning said second controller to change course, and means actuated by said second controller for adjusting said first controller differentially through said follow-back connection.

20. A direction maintaining means for aircraft comprising a free or directional gyroscope, a direction device actuated by the relative position of the craft and gyroscope, a magnetic compass, a controller governed thereby, and means actuated by said controller for slowly altering said device to correct for straying of the gyroscope.

21. In an automatic steering means for craft, a normally free gyroscope, means actuated therefrom for steering the craft, a magnetic compass, means for setting the course thereon, and automatic means operable by said magnetic compass upon deviation of the craft from the course set with respect thereto for correcting the course steered by said first named means.

ELMER A. SPERRY, Jr.